(12) United States Patent
Kijimoto

(10) Patent No.: US 6,889,601 B2
(45) Date of Patent: May 10, 2005

(54) FRYER

(75) Inventor: Hideki Kijimoto, Nagoya (JP)

(73) Assignee: Paloma Industries Limited, Nagoya (JP)

( * ) Notice: Subject to any disclaimer, the term of this patent is extended or adjusted under 35 U.S.C. 154(b) by 106 days.

(21) Appl. No.: 10/780,977

(22) Filed: Feb. 18, 2004

(65) Prior Publication Data
US 2004/0163639 A1 Aug. 26, 2004

(30) Foreign Application Priority Data
Feb. 25, 2003 (JP) ......................................... 2003-047984

(51) Int. Cl.[7] .............................................. A47J 37/12
(52) U.S. Cl. ........................... 99/330; 99/331; 99/403; 126/374.1; 126/391.1
(58) Field of Search .................. 99/325–334, 337, 99/338, 342, 403–410; 126/391.1, 389.1, 390.1, 378.1, 376.1, 343.5 A, 343.5 R; 210/167, DIG. 8; 219/492, 494, 497, 506, 508, 442, 510, 486, 512; 340/589; 426/231–233, 438, 519, 808; 431/1, 170, 326; 700/90, 99, 85, 300

(56) References Cited

U.S. PATENT DOCUMENTS

| | | | |
|---|---|---|---|
| 4,228,730 A | * | 10/1980 | Schindler et al. ......... 99/329 R |
| 4,372,980 A | * | 2/1983 | Luebke et al. .............. 426/231 |
| 4,639,213 A | * | 1/1987 | Simpson ..................... 431/326 |
| 4,812,625 A | | 3/1989 | Ceste, Sr. |
| 4,848,318 A | | 7/1989 | Brewer |
| 4,858,119 A | * | 8/1989 | Waugh et al. ................ 700/90 |
| 4,913,038 A | | 4/1990 | Burkett et al. |
| 4,913,041 A | * | 4/1990 | Taber et al. .................. 99/403 |
| 4,976,609 A | * | 12/1990 | Grob et al. .............. 126/373.1 |
| 5,033,368 A | | 7/1991 | Brewer |
| 5,038,753 A | * | 8/1991 | Yokoyama et al. ...... 126/391.1 |
| 5,101,558 A | * | 4/1992 | Grob et al. .............. 29/890.02 |
| 5,185,168 A | * | 2/1993 | Takahashi ................... 426/233 |
| 5,261,322 A | * | 11/1993 | Yokoyama et al. ........... 99/330 |
| 5,417,202 A | * | 5/1995 | Cote ....................... 126/391.1 |
| 5,490,449 A | | 2/1996 | Meister et al. |
| 5,544,567 A | * | 8/1996 | Davis et al. .................. 99/336 |
| 5,706,717 A | * | 1/1998 | Barner ........................ 99/330 |
| 5,819,638 A | | 10/1998 | Yokoyama |

* cited by examiner

Primary Examiner—Timothy F. Simone
(74) Attorney, Agent, or Firm—Burr & Brown

(57) ABSTRACT

A fryer which can maintain a set temperature accurately preventing an overshoot of cooking oil temperature is provided. In the fryer, three burners (3–5) are dispersed against the oil vat such that their combustion can be controlled independently. On the other hand, the heating control means (8), according to a detected temperature, selects and carries out one mode among at least two heating modes, which are, a full power mode in which all burners (3–5) operate at the same time, and a low power mode in which two burners among three burners (3–5) operate. When the low power mode is selected, two burners are operated in a predetermined order to switch a heating area of the oil vat (2).

4 Claims, 5 Drawing Sheets

FRYER

BACKGROUND OF THE INVENTION

This application claims the benefit of Japanese Patent Application Number 2003-47984 filed Feb. 25, 2003, the entirety of which is incorporated by reference.

1. Field of the Invention

The present invention relates to a fryer which comprises an oil vat for containing cooking oil and burners for heating the oil vat so as to fry foods such as fried chicken or potatoes.

2. Description of Related Art

A fryer comprises an oil vat for containing cooking oil, a plurality of burners for heating the oil vat, a temperature detecting means for detecting a cooking oil temperature of the oil vat and a controller as a heating control means for controlling combustion of the burners. The controller carries out an on/off control of the burners by switching combustion/stop thereof so as to maintain an instructed set temperature based on the detected temperature obtained from the temperature detecting means. (For example, please refer to Japanese Patent Examined Publication No. 06-077556 and Japanese Patent Unexamined Publication No. 10-043063A)

However, since this on/off control of the burners switches a combustion/stop of all the burners, an overshoot of cooking oil temperature could occur easily. Even if a duty control is conducted to adjust total heating quantity by regulating an on/off time rate, it is hard to prevent an overshoot effectively.

An object recited in a first aspect of the present invention is to provide a fryer which can accurately maintain a set temperature preventing an overshoot of cooking oil temperature.

SUMMARY OF THE INVENTION

In order to achieve the above object, according to a first aspect of the present invention, there is provided a fryer wherein some burners are provided separately against an oil vat such that the combustion of each burner can be controlled independently. On the other hand, a heating control means, according to a detected temperature, selects and carries out one mode among at least two heating modes, which are, a full power mode in which all burners are operated at the same time, and a low power mode in which one or some burner(s) are operated. When the low power mode is carried out, one or some burner(s) are operated in a predetermined order to switch a heating area of the oil vat.

According to a second aspect of the present invention, in addition to an object of the first aspect, there is provided a fryer wherein a cross sectional view of the oil vat is a circle in order to equalize temperature distribution of cooking oil more desirably. Further, three burners are disposed evenly against the bottom point of the oil vat in the circumference direction and two burners are operated by turns in the low power mode.

According to a third aspect of the present invention, in addition to the objects of the first or second aspects, there is provided a fryer wherein a storing means is provided for storing information concerning the combination of burners when the low power mode is terminated in order to equalize the burden to each burner. When the next low power mode is selected, combustion starts with the sequent combination obtained from the stored information.

DETAILED DESCRIPTION OF THE PREFERRED EMBODIMENT

Hereinafter, a preferred embodiment of the present invention will be described with reference to the accompanying drawings.

Figure 1:
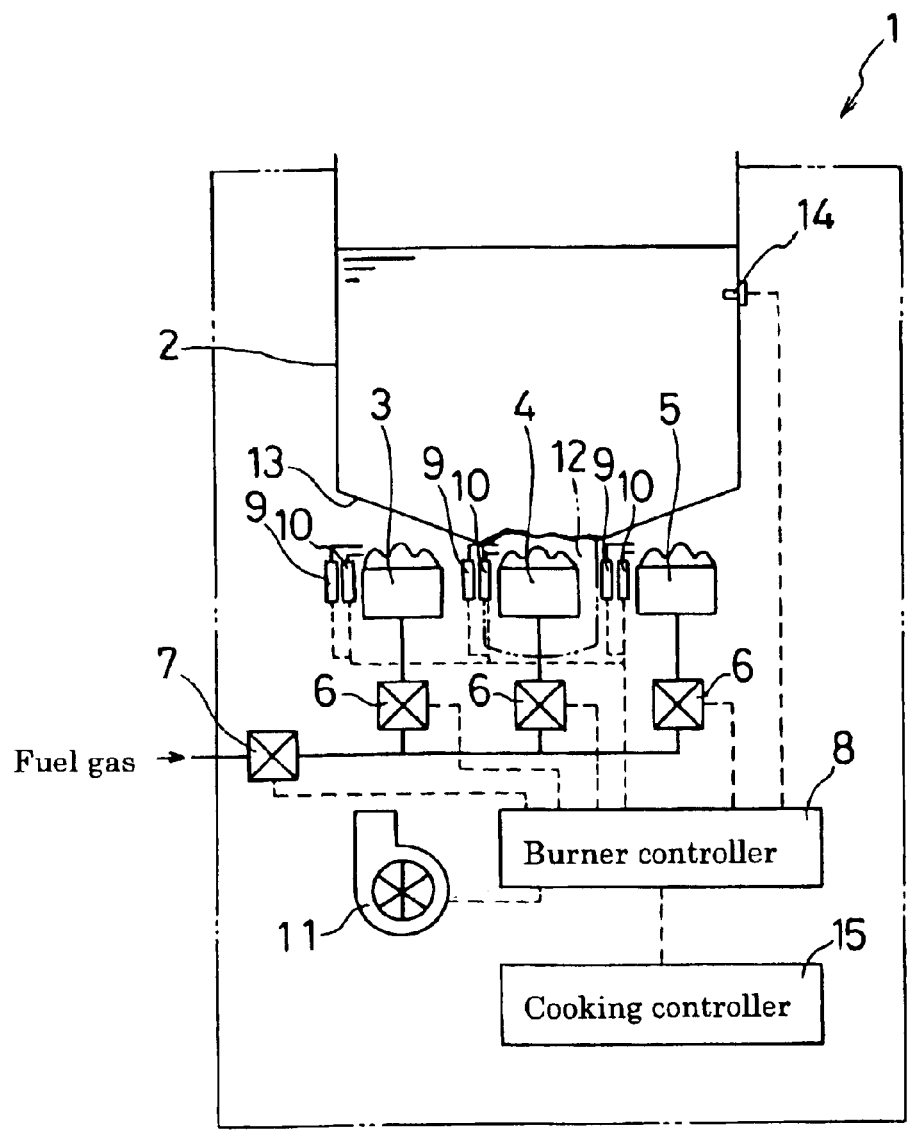
FIG. 1 is a schematic view of a fryer.
Figure 2:
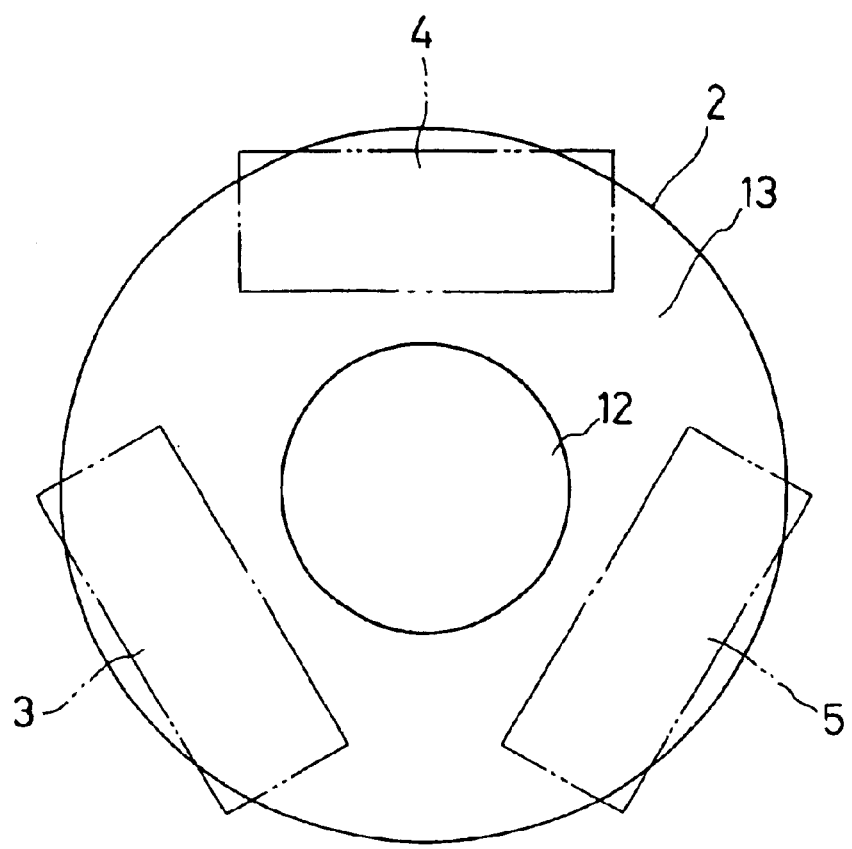
FIG. 2 is an explanatory view of the bottom of an oil vat showing an arrangement of three burners.

FIG. 1 is a schematic view of an example of a fryer. The fryer includes an oil vat 2 for containing cooking oil and a first burner 3, a second burner 4 and a third burner 5 which are provided below the oil vat 2 to heat the same from the bottom. Each burner 3–5 has a burner electromagnetic valve 6 respectively, and a main electromagnetic valve 7 is provided with an upstream gas conduit before the conduit being forked. Each of the burner electromagnetic valve 6 and the main electromagnetic valve 7 is controlled to be opened/closed individually by a burner controller 8. A discharge electrode 9 for ignition and a flame rod 10 for detection of a flame are provided with each burner 3–5 respectively. The burner controller 8 can control the combustion of each burner 3–5 independently. The reference number 11 indicates a blower provided below the burners 3–5 for supplying air for combustion. The burner controller 8 controls the operation of the blower It should be noted that a cross sectional view of the oil vat 2 is a circle. A bottom of the oil vat 2 includes two parts configuration which are a cold zone 12 at the deepest center and an inclined lower part 13, whose shape is like a mortar, inclining lower toward the cold zone 12. Each burner 3–5 has a configuration in which a plurality of flat burner elements are aligned to form a box-shaped unit, and as shown in FIG. 2, three burners 3–5 are evenly disposed in the circumference direction around the cold zone 12 to be able to heat the inclined lower part 13.

The oil vat 2 has a temperature sensor 14 as a temperature detecting means for detecting an oil temperature, and temperature detecting signal obtained from the temperature sensor 14 is inputted to the burner controller 8. The reference number 15 indicates a cooking controller disposed at the front of the fryer 1 and connected electrically with the burner controller B. At the cooking controller 15, a display portion (not shown), a switch for starting cooking and an operating portion are provided. In the operating portion, cooking menus, such as a set temperature and cooking time, can be selected.

When a certain cooking menu is selected and a switch is turned ON at the cooking controller 15 to start cooking, the burner controller 8 starts to monitor a cooking oil temperature obtained from the temperature sensor 14 according to the selected cooking menu. During the monitoring of the oil temperature, the burner controller 8 conducts an open/close control of the burner electromagnetic valve 6 and the main electromagnetic valve 7 based on a monitoring result. Further, the controller 8 conducts an ignition/extinction control of each burner 3–5 respectively, whereby foods input in the oil vat 2 can be fried. Hereinafter, a cooking control of foods will be explained based on a flowchart in FIG. 3.

When a switch is turned ON at the cooking controller 15 to start cooking, a cooking timer starts at S1. Then a cooking oil temperature Tx is detected at S2 and it is compared with a set temperature Ts at S3. In the event that Tx is (Ts−1)

degrees or above, combustion of each burner 3–5 is cancelled at S4, and it is determined whether or not the cooking timer is up at S7. If time is not up, it goes back to S2 to monitor the detected temperature Tx. On the other hand, if Tx is below Ts within the range of 10° C. at S3, it goes to S5 to carry out a low power mode in which one or two burner(s) 3–5 start combustion.

Figure 4:
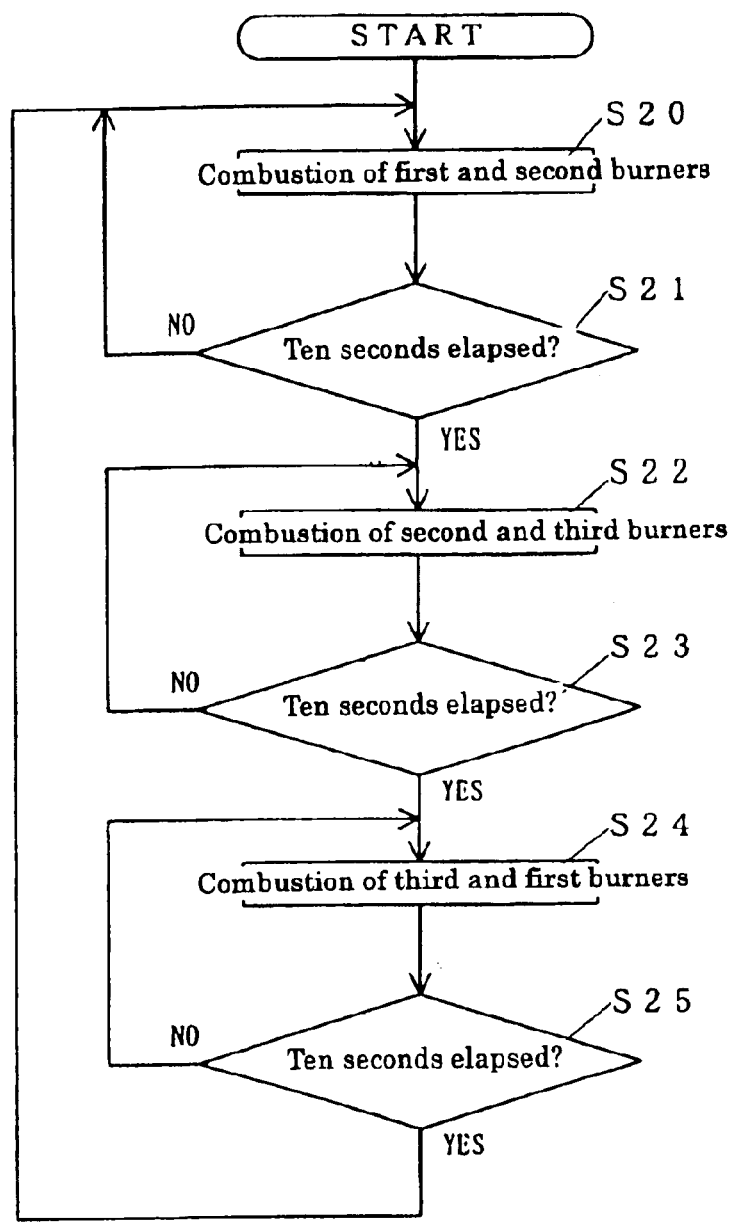
FIG. 4 is a flow chart of showing a combustion control of three burners in a low power mode.
Figure 5:
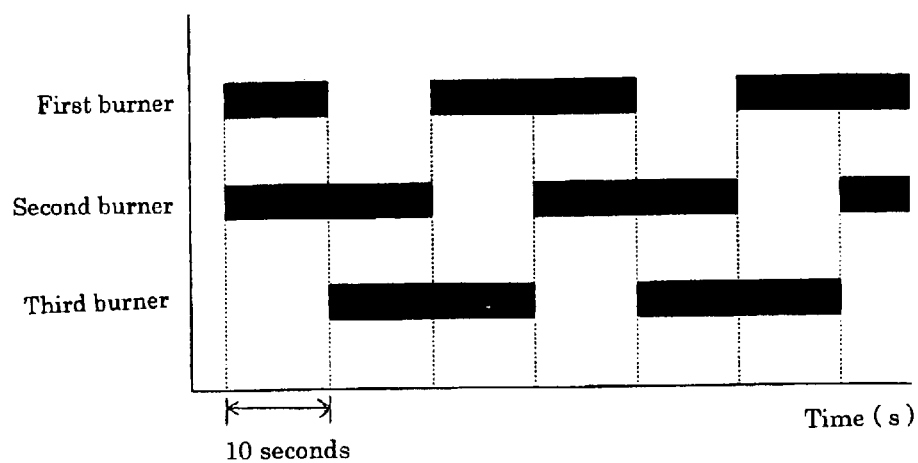
FIG. 5 is a time chart showing a switching order of three burners in a low power mode.

As shown in FIGS. 4 and 5, in the low power mode, the first burner 3 and the second burner 4 carry out combustion for ten seconds at S20 and S21, then the second burner 4 and the third burner 5 operate for ten seconds at S22 and S23, and the first burner 3 and the third burner 5 operate for ten seconds at S24 and S25. After 10 seconds' combustion of the first burner 3 and the third burner 5, it goes back to S20. That is, two burners are paired in turn and carry out combustion alternately, whereby a heating area of the inclined lower part 13 is switched. With this alternate switching of the heating area, a combustion time of each burner 3–5 can be equalized, and thus equalization of temperature distribution of the cooking oil can be realized.

Figure 3:
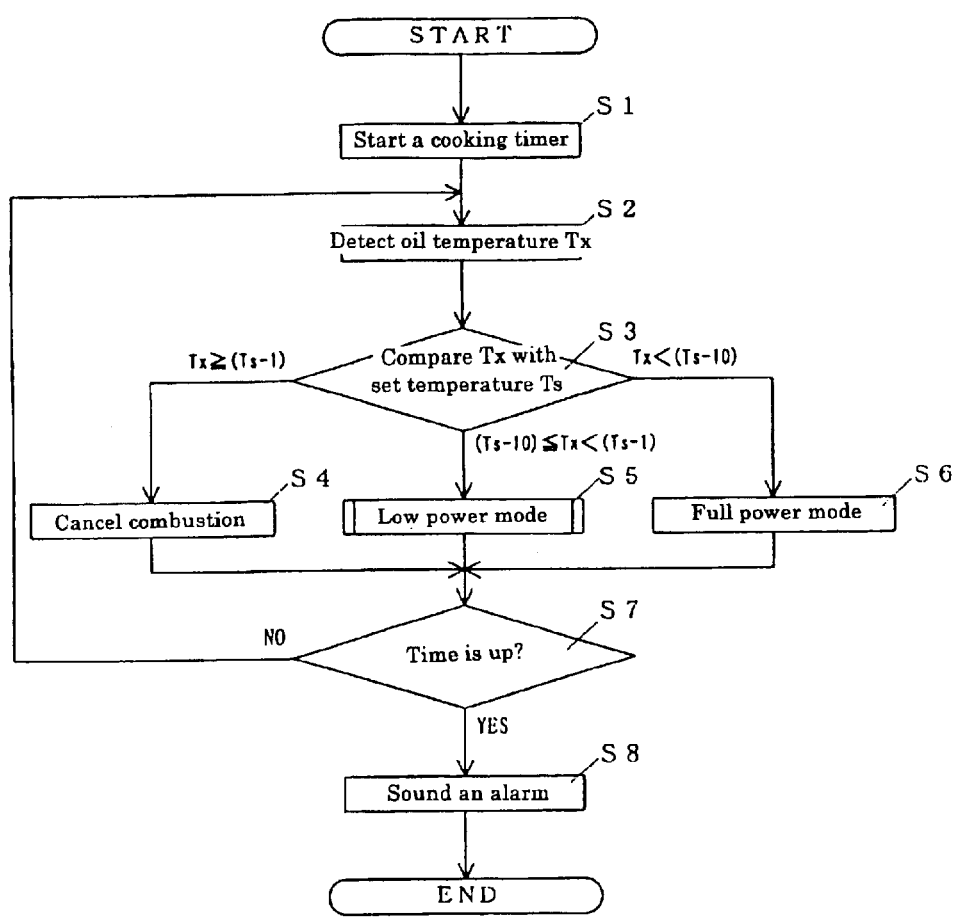
FIG. 3 is a flow chart showing a cooking control of foods.

Further, at S3 in FIG. 3, if Tx is below Ts by 10 degrees or more, it goes to S6 and a full power mode is conducted in which all burners 3–5 operate at the same time. When Tx reaches (Ts−1) degrees in a low power mode or a full power mode, it goes to S4 to stop the combustion.

As described above, one of the conditions which are combustion stop, the low power mode or the full power mode is carried out based on the comparison result of Tx and Ts at S3, so that frying foods maintaining the cooking oil temperature within the set temperature Ts is carried out. When the timer finishes at S7, all burners 3–5 stop combustion at S8. Then, an alarm sounds and cooking is terminated.

In carrying out the low power mode, when Tx is out of the range of (Ts−10)≦Tx<(Ts−1), the low power mode is terminated and it goes to combustion stop or the full power mode. In this case, the burner controller 8 stores information concerning the combination of the burners 3–5 at the time of the termination of the low power mode in a nonvolatile memory and the like. Owing to this, in the next low power mode combustion starts with the sequent combination obtained from the stored information. In this way, by providing a storing means for storing information concerning the combination of burners when the low power mode is terminated, the combustion starts with the sequent combination in the next low power mode. As a result, the burden for each burner 3–5 is equalized more appropriately.

According to the fryer 1 with the above structure, by adopting the low power mode in which two burners among three burners 3–5 are combined in a sequential order, the cooking oil can be heated gradually. As a result, an overshoot of the cooking oil is effectively prevented and the set temperature is maintained accurately. Further, temperature distribution of the cooking oil in the oil vat 2 is equalized and the burden for each burner 3–5 is equalized, resulting in improving durability as a whole. On the other hand, when the temperature of the cooking oil is far below the set temperature, all burners 3–5 operate in the full power mode, and thus the cooking oil temperature can reach the set temperature rapidly. Accordingly, both a rapid increase of the cooking temperature and prevention of the overshooting can be realized at the same time, so that cooking performance can be improved.

In this embodiment a cross sectional view of the oil vat 2 is a circle and three burners 3–5 are disposed evenly against the inclined lower part 13 of the oil vat 2 in the circumference direction. In addition, when the low power mode is selected two burners among three burners are operated in a sequential order. Therefore, the temperature distribution of the oil vat 2 can be equalized more preferably.

In the above embodiment, when the low power mode is selected two burners operate to be switched. As other modifications, a single burner may be operated in turn, and further, if four or more burners are provided, any number of burners may be combined except the combination of all burners to be operated in turn. It should be noted that the low power mode could be diversely conducted. For example, the number of burners may be changed according to the degree of temperature lowering from the set temperature. Specifically, a single burner operates in turn if the range of temperature lowering is within 5° C., and two burners operate in turn if the range of temperature lowering is 5–10° C.

Moreover, in the above embodiment, a burner or a plurality of burners are selected for continuous combustion in both the full power mode and the low power mode. However, their combustion may be conducted intermittently for predetermined seconds using an on/off control in the both modes. Specifically, in the low power mode, the combination of burners can be switched by turns in a predetermined order within a consecutive ON time, or a predetermined combination of burners can be switched by turns every time the ON time starts.

It should be noted that a structure of the oil vat or a kind of the burner and the like can be varied properly, for example, the present invention can be applied to a pressure fryer with a lid to hermetically seal the oil vat.

According to a first aspect of the present invention, there is provided a fryer adopting the low power mode, whereby the cooking oil can be heated gradually. As a result, an overshoot of the cooking oil is effectively prevented and the set temperature can be maintained accurately. Further, temperature distribution of the cooking oil in the oil vat is equalized and the burden for each burner is equalized, resulting in improving durability as a whole. On the other hand, when a temperature of the cooking oil is far below the set temperature, all burners operate in the full power mode, and thus the cooking oil temperature can reach the set temperature rapidly. Accordingly, both a rapid increase of the cooking temperature and prevention of the overshooting can be realized at the same time, whereby cooking performance can be improved.

According to a second aspect of the present invention, in addition to an advantageous effect of the first aspect, there is provided a fryer wherein a cross sectional view of the oil vat is a circle and three burners are disposed evenly against the bottom point of the oil vat 2 in the circumference direction. In addition, in the low power mode two burners among three burners are operated in a sequential order. As a result, the temperature distribution of the oil vat can be equalized more preferably.

According to a third aspect of the present invention, in addition to the advantageous effects of the first or second aspects, there is provided a fryer wherein a storing means is provided for storing information concerning the combination of burners when the low power mode is terminated, and combustion starts with the sequent combination obtained from the information in the next low power mode. Therefore, the burden to each burner can be equalized.

What is claimed is:

1. A fryer comprising:
    an oil vat for containing cooking oil;

a plurality of burners for heating the oil vat;

a temperature detecting means for detecting a temperature of the cooking oil, and a heating control means for controlling the combustion of the burners based on a detected temperature obtained from the temperature detecting means, wherein the burners are separately provided against the oil vat such that the combustion thereof can be controlled independently and the heating control means, according to the detected temperature, selects and carries out one mode among at least two heating modes, which are, a full power mode in which all burners operate at the same time, and a low power mode in which one or some burner(s) operate, and when the low power mode is carried out, one or some burner(s) are switched in a predetermined order to switch a heating area of the oil vat.

2. A fryer as claimed in claim 1, wherein a cross sectional view of the oil vat is a circle and three burners are disposed evenly against the bottom point of the oil vat in the circumference direction and in the low power mode two burners are operated by turns.

3. A fryer as claimed in claim 1, wherein a storing means is provided for storing information concerning the combination of burners when the low power mode is terminated, and in the next low power mode combustion starts with the sequent combination obtained from the stored information.

4. A fryer as claimed in claim 2, wherein a storing means is provided for storing information concerning the combination of burners when the low power mode is terminated, and in the next low power mode combustion starts with the sequent combination obtained from the stored information.

* * * * *